United States Patent
Zheng et al.

(10) Patent No.: US 11,908,456 B2
(45) Date of Patent: Feb. 20, 2024

(54) AZIMUTH ESTIMATION METHOD, DEVICE, AND STORAGE MEDIUM

(71) Applicant: Tencent Technology (Shenzhen) Company Limited, Shenzhen (CN)

(72) Inventors: Jimeng Zheng, Shenzhen (CN); Yi Gao, Shenzhen (CN); Meng Yu, Shenzhen (CN); Ian Ernan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 597 days.

(21) Appl. No.: 17/006,440

(22) Filed: Aug. 28, 2020

(65) Prior Publication Data
US 2020/0395005 A1    Dec. 17, 2020

Related U.S. Application Data

(63) Continuation of application No. PCT/CN2019/099049, filed on Aug. 2, 2019.

(30) Foreign Application Priority Data

Aug. 6, 2018 (CN) .......................... 201810887965.5

(51) Int. Cl.
*G10L 15/20*    (2006.01)
*G10L 15/08*    (2006.01)
(Continued)

(52) U.S. Cl.
CPC .............. *G10L 15/08* (2013.01); *G10L 15/22* (2013.01); *G10L 25/18* (2013.01); *G10L 25/21* (2013.01); *G10L 2015/088* (2013.01)

(58) Field of Classification Search
CPC ...................................................... G10L 25/87
See application file for complete search history.

(56) References Cited

U.S. PATENT DOCUMENTS 6,707,910 B1    3/2004  Valve et al.
9,818,407 B1 *  11/2017  Secker-Walker ....... G10L 25/78
(Continued)

FOREIGN PATENT DOCUMENTS

CN    106251877 A    12/2016
CN    106531179 A    3/2017
(Continued)

OTHER PUBLICATIONS

Extended European Search Report, EP19846963.7, dated Aug. 9, 2021, 10 pgs.
(Continued)

*Primary Examiner* — Seong-Ah A Shin
(74) *Attorney, Agent, or Firm* — Morgan, Lewis & Bockius LLP

(57) ABSTRACT

Embodiments of this application discloses an azimuth estimation method performed at a computing device, the method including: obtaining, in real time, multi-channel sampling signals and buffering the multi-channel sampling signals; performing wakeup word detection on one or more sampling signals of the multi-channel sampling signals, and determining a wakeup word detection score for each channel of the one or more sampling signals; performing a spatial spectrum estimation on the buffered multi-channel sampling signals to obtain a spatial spectrum estimation result, when the wakeup word detection scores of the one or more sampling signals indicates that a wakeup word exists in the one or more sampling signals; and determining an azimuth of a target voice associated with the multi-channel sampling signals according to the spatial spectrum estimation result and a highest wakeup word detection score, thereby improv-
(Continued)

ing the accuracy of the azimuth estimation in a voice interaction process.

20 Claims, 6 Drawing Sheets

(51) Int. Cl.
*G10L 15/22* (2006.01)
*G10L 25/18* (2013.01)
*G10L 25/21* (2013.01)

(56) References Cited

U.S. PATENT DOCUMENTS

| | | | |
|---|---|---|---|
| 9,940,949 B1* | 4/2018 | Vitaladevuni | G10L 25/78 |
| 10,109,294 B1* | 10/2018 | Ayrapetian | G10L 21/0208 |
| 10,192,546 B1* | 1/2019 | Piersol | G10L 15/08 |
| 2013/0029684 A1* | 1/2013 | Kawaguchi | H04R 3/005 |
| | | | 455/456.1 |
| 2015/0379990 A1 | 12/2015 | Nongpiur | |
| 2016/0267913 A1* | 9/2016 | Kim | G06F 1/3231 |
| 2018/0033428 A1* | 2/2018 | Kim | G10L 21/0208 |
| 2019/0364375 A1* | 11/2019 | Soto | G10L 15/22 |
| 2020/0226356 A1* | 7/2020 | Shin | B25J 13/003 |
| 2021/0016431 A1* | 1/2021 | Kim | B25J 19/026 |
| 2021/0366476 A1* | 11/2021 | Smith | G06F 3/167 |
| 2022/0301568 A1* | 9/2022 | Lokanath | G10L 15/16 |

FOREIGN PATENT DOCUMENTS

| | | |
|---|---|---|
| CN | 106611597 A | 5/2017 |
| CN | 107533842 A | 1/2018 |
| CN | 107910013 A | 4/2018 |
| CN | 108122556 A | 6/2018 |
| CN | 108122563 A | 6/2018 |
| WO | WO 2015130970 A1 | 9/2015 |
| WO | WO 2018022222 A1 | 2/2018 |
| WO | WO 2018035334 A1 | 2/2018 |

OTHER PUBLICATIONS

Jwu-Sheng Hu et al., "Wake-Up-Word Detection by Estimating Formants from Spatial Eigenspace Information", International Conference on Mechatronics and Automation (ICMA), Chengdu, China, Aug. 5, 2012, XP032224632, ISBN: 978-1-4673-1275-2, 6 pgs.

Sunit Sivasankaran et al., "Keyword-based Speaker Localization: Localizing a Target Speaker in a Multi-speaker Environment", Jun. 18, 2018, XP055828680, 6 pgs., Retrieved from the Internet: https://hal.archives.ouvertes.fr/hal-01817519/document.

Marc Donner et al., "Awakening History: Preparing a Museum Tour Guide Robot for Augmenting Exhibits", 2013 European Conference on Mobile Robots, Jan. 2, 2014, 6 pgs.

Tencent Technology, WO, PCT/CN2019/099049, Oct. 16, 2019, 5 pgs.

Tencent Technology, IPRP, PCT/CN2019/099049, Feb. 9, 2021, 6 pgs.

Tencent Technology, ISR, PCT/CN2019/099049, Oct. 16, 2019, 3 pgs.

* cited by examiner

AZIMUTH ESTIMATION METHOD, DEVICE, AND STORAGE MEDIUM

CROSS-REFERENCE TO RELATED APPLICATIONS

This application is a continuation application of PCT Patent Application No. PCT/CN2019/099049, entitled "AZIMUTH ESTIMATION METHOD, DEVICE, AND STORAGE MEDIUM" filed on Aug. 2, 2019, which claims priority to Chinese Patent Application No. 201810887965.5, entitled "AZIMUTH ESTIMATION METHOD, DEVICE, AND STORAGE MEDIUM" filed on Aug. 6, 2018, all of which are incorporated by reference in their entirety.

FIELD OF THE TECHNOLOGY

Embodiments of this application relate to the field of voice processing technologies, and in particular, to an azimuth estimation method, a device, and a computer-readable storage medium.

BACKGROUND OF THE DISCLOSURE

With the popularity of smart speakers and derivatives thereof, voice interaction between humans and machines, especially far-field voice interaction, has gradually become an important research direction. In the field of voice interaction, far-field voice interaction generally indicates that a distance is greater than 1 meter. The voice interaction between humans and machines is considered to be the most important user traffic portal in the future. Therefore, Internet platforms and content service providers both attach great importance to the exploration and innovation of speech recognition interfaces.

At present, voice interaction smart devices in the field of consumer electronics are mainly products such as smart speakers, smart TVs or TV boxes with a voice control function. Main usage scenarios of such products are homes or living rooms of users. In this type of usage scenario, the reverberation of a room and noise in an environment greatly challenge the speech recognition, thus severely affecting the user experience.

To achieve better far-field speech recognition performance, the foregoing voice interaction devices are generally equipped with multi-microphone arrays, and the voice signal quality is improved by using a beamforming algorithm. However, to achieve the optimal performance, the beamforming algorithm requires a given azimuth of a target voice, and is extremely sensitive to the accuracy of the azimuth. Therefore, to improve the estimation accuracy of a target voice azimuth has become a bottleneck in improving the performance of the far-field speech recognition system.

SUMMARY

Embodiments of this application provide an azimuth estimation method, to improve the accuracy of an azimuth estimation in a voice interaction process. The embodiments of this application further provide a corresponding device and computer-readable storage medium.

According to a first aspect of the embodiments of this application, an azimuth estimation method is performed at a computing device, the method including:

obtaining, in real time, multi-channel sampling signals and buffering the multi-channel sampling signals;

performing wakeup word detection on one or more sampling signals of the multi-channel sampling signals, and determining a wakeup word detection score for each channel of the one or more sampling signals;

performing a spatial spectrum estimation on the buffered multi-channel sampling signals to obtain a spatial spectrum estimation result, when the wakeup word detection scores of the one or more sampling signals indicates that a wakeup word exists in the one or more sampling signals; and determining an azimuth of a target voice associated with the multi-channel sampling signals according to the spatial spectrum estimation result and a highest wakeup word detection score.

According to a second aspect of the embodiments of this application, a computing device comprises one or more processors, memory and a plurality of computer programs stored in the memory that, when executed by the one or more processors, cause the computing device to perform the aforementioned azimuth estimation method according to the first aspect.

According to a third aspect of the embodiments of this application, a non-transitory computer-readable storage medium stores a plurality of computer programs that, when executed by one or more processors of a computing device, cause the computing device to perform the aforementioned azimuth estimation method according to the first aspect.

According to another aspect of the embodiments of this application, a computer program product including instructions is provided, the instructions, when run on a computer, causing the computer to perform the method according to the first aspect.

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

DESCRIPTION OF EMBODIMENTS

The following describes embodiments of this application with reference to the accompanying drawings. Apparently, the described embodiments are merely some but not all of the embodiments of this application. A person of ordinary skill in the art may know that as the technology evolves and a new scenario emerges, the technical solutions provided in the embodiments of this application are also suitable for resolving similar technical problems.

Embodiments of this application provide an azimuth estimation method, to improve the accuracy of an azimuth estimation in a voice interaction process. The embodiments of this application further provide a corresponding device and non-transitory computer-readable storage medium. The following separately gives detailed descriptions.

A terminal device in the embodiments of this application is a voice interaction device, which may be a device with a voice interaction function, such as a speaker, a TV, a TV box or a robot.

As a means for protecting user privacy and reducing power consumption of a whole machine, a terminal device with a voice interaction function is generally provided with a wakeup word (also known as "wake word"). The wakeup word is generally a preset word or sentence. After a wakeup word is spoken out by a user and detected by the terminal device, a voice signal sent by the user is used as a command and sent to a cloud device for a voice interactive service. When sampling sound signals, the terminal device may acquire sound signals in all the directions. The sound signals may generally include noise signals, and the noise signals may affect the human-machine voice interaction. Therefore, generally, the terminal device may determine an azimuth of a voice sent out by the user, enhance a signal in the direction of the azimuth, and suppress signals in other directions, thereby ensuring smooth human-machine voice interaction. Therefore, in a human-machine interaction process, an estimation for an azimuth of voice sent out by a user is particularly important.

Figure 1:
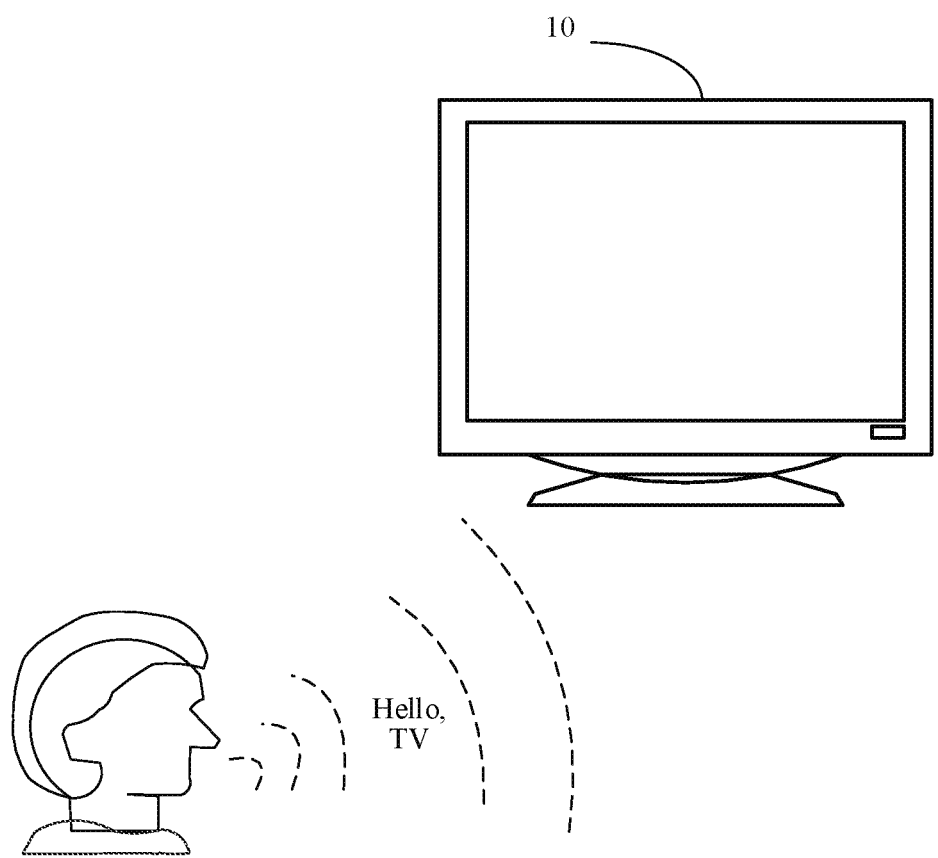
FIG. 1 is a schematic diagram of an example of a scenario of human-machine voice interaction according to an embodiment of this application.

FIG. 1 is a schematic diagram of an example of a scenario of human-machine voice interaction according to an embodiment of this application.

As shown in FIG. 1, to wake up a smart TV 10 with a voice interaction function, a user may speak out a wakeup word. For example, in such a scenario, the wakeup word is "Hello, TV". The wakeup word reaches the smart TV 10 through transmission in the air. The smart TV is provided with a multi-array sound receiver, and the receiver may be a microphone. Each array may be construed as a channel, and each channel can receive a sampling signal of one channel. The smart TV 10 may buffer the multi-channel sampling signals, then perform wakeup word detection on the sampling signal of each channel in the multi-channel sampling signals, and determine a wakeup word detection score of the sampling signal of each channel. If it is determined that the wakeup word exists according to the wakeup word detection score of the sampling signal of each channel, a spatial spectrum estimation is performed on the buffered multi-channel sampling signals to obtain a spatial spectrum estimation result, the wakeup word being included in a target voice. An azimuth of the target voice is determined according to the spatial spectrum estimation result and a highest wakeup word detection score.

The target voice is a voice of the user sending out the wakeup word, the target voice including the wakeup word.

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

Figure 2:
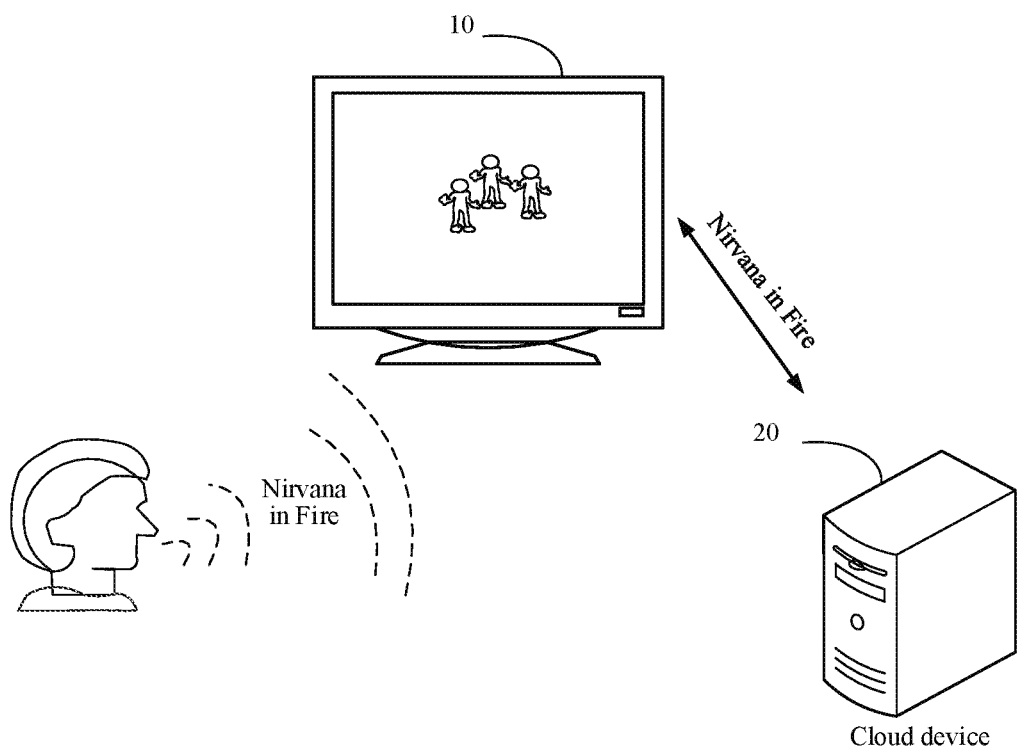
FIG. 2 is a schematic diagram of another example of a scenario of human-machine voice interaction according to an embodiment of this application.

After the azimuth of the target voice is determined, as shown in FIG. 2, the smart TV 10 can perform voice interaction with a cloud device 20. In the voice interaction process, if the user says "Nirvana in Fire" to the smart TV 10, the smart TV 10 can perform speech recognition on acquired voice signals, or transmit the acquired voice signals to the cloud device 20 for speech recognition. After recognizing speech content "Nirvana in Fire", the cloud device 20 can return content related to the TV play "Nirvana in Fire" to the smart TV 10.

The azimuth estimation and voice interaction in the embodiments of this application are briefly described above with reference to scenario examples. The following describes the azimuth estimation method in the embodiments of this application with reference to FIG. 3.

Figure 3:
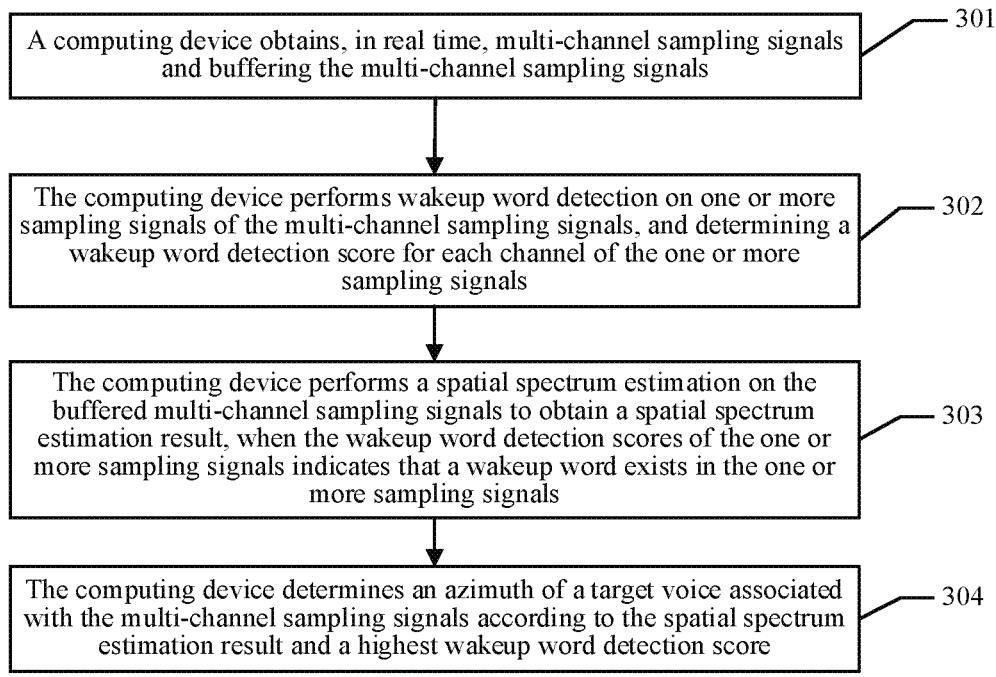
FIG. 3 is a schematic diagram of an embodiment of an azimuth estimation method according to an embodiment of this application.

As shown in FIG. 3, an embodiment of the azimuth estimation method provided in an embodiment of this application includes:

301. A computing device (e.g., a terminal device) obtains, e.g., in real time, multi-channel sampling signals and buffers the multi-channel sampling signals.

302. The terminal device performs wakeup word detection on one or more sampling signals of the multi-channel sampling signals, and determines a wakeup word detection score for each channel of the one or more sampling signals.

303. The terminal device performs a spatial spectrum estimation on the buffered multi-channel sampling signals to obtain a spatial spectrum estimation result, when the wakeup word detection scores of the one or more sampling signals indicates that a wakeup word exists in the one or more sampling signals.

304. The terminal device determines an azimuth of a target voice associated with the multi-channel sampling signals according to the spatial spectrum estimation result and a highest wakeup word detection score.

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

Figure 4:
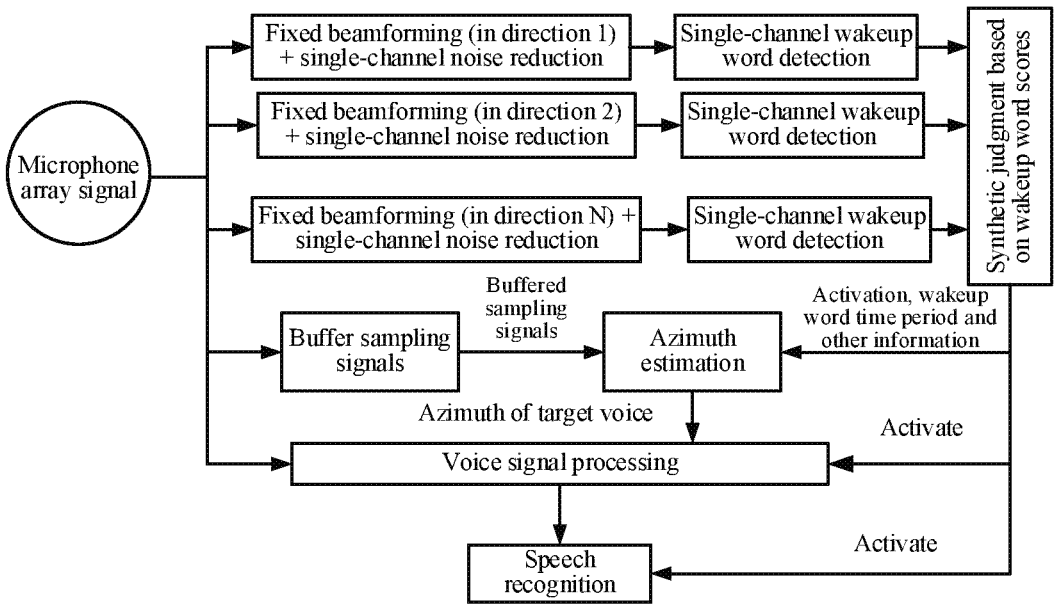
FIG. 4 is a schematic diagram of another embodiment of an azimuth estimation method according to an embodiment of this application.

The azimuth estimation method provided in the embodiments of this application may be further understood with reference to FIG. 4. As shown in FIG. 4, the terminal device may receive array signals through a microphone, and then divide the received array signals into N beams in different directions, each beam of signal passing through a channel. As shown in FIG. 4, N beams are in directions 1 to N respectively. For example, if N=4, the 0-degree direction is direction 1, the 90-degree direction is direction 2, the 180-degree direction is direction 3, and the 270-degree direction is direction 4. Single-channel noise reduction may be performed on the sampling signal of each channel, to reduce noise on the channel. Then, the wakeup word detection may be performed on the sampling signal of each channel.

Optionally, the performing wakeup word detection on one or more sampling signals of the multi-channel sampling signals, and determining a wakeup word detection score for each channel of the one or more sampling signals may include:

performing the wakeup word detection on the one or more sampling signals in the multi-channel sampling signals, and determining a confidence of a wakeup word of each channel of the one or more sampling signals, the confidence being a similarity between content in the sampling signal and a preconfigured wakeup word; and determining the wakeup word detection score for each channel of the one or more sampling signals according to the confidence of the wakeup word of the sampling signal.

That is, to detect the wakeup word is to mainly detect a similarity between content in the sampling signal in the channel and a preconfigured wakeup word. If the preconfigured wakeup word is "Hello, TV", and content detected in a sampling signal of one channel is "TV", it indicates that the sampling signal of the channel is similar to the preconfigured wakeup word to some extent, and a wakeup word detection score of the sampling signal of the channel may be 5. If content detected in the sampling signal of another channel is "Hello, T", it indicates that the sampling signal of the channel is similar to the preconfigured wakeup word to a great extent, and a wakeup word detection score of the sampling signal of the channel may be 8. Certainly, a specific wakeup word detection score is obtained through calculation according to an algorithm. The wakeup word detection score herein is merely an example for description, and is not to be construed as a limitation on the wakeup word detection score.

After detecting the wakeup word detection score of the sampling signal of each channel, the terminal device needs to make a synthetic judgment according to the wakeup word detection score of the sampling signal of each channel. A solution of the synthetic judgment may be:

determining that the wakeup word exists when the wakeup word detection score of any channel of the one or more sampling signals is greater than a score threshold.

For example, if the score threshold is 6, and wakeup word detection scores of four channels are 3, 5, 7 and 8 respectively, the wakeup word detection scores of two channels are greater than the score threshold 6, and therefore it may be determined that the wakeup word exists. Certainly, this is only a determination solution for determining the existence of the wakeup word, and there may be other feasible determination solutions. For example, whether there the wakeup word exits is determined according to a cumulative score of all channels.

After it is determined that the wakeup word exists, functions such as azimuth estimation, voice signal processing and speech recognition can be activated.

In addition, after determining the existence of the wakeup word, the terminal device may further:

determine a time period from appearance to disappearance of the wakeup word; and extract a target sampling signal within the time period from the buffered multi-channel sampling signals.

Correspondingly, the performing, by the terminal device, a spatial spectrum estimation on the buffered multi-channel sampling signals to obtain a spatial spectrum estimation result includes:

performing the spatial spectrum estimation on the target sampling signal to obtain the spatial spectrum estimation result.

After the time period from the appearance to the disappearance of the wakeup word is determined, when the spatial spectrum estimation is performed on the buffered multi-channel sampling signals, only the target sampling signal during the time period needs to be extracted without estimating all the buffered sampling signals, so that the amount of computing in the spatial spectrum estimation may be reduced.

The determining a time period from appearance to disappearance of the wakeup word may include:

determining a time point of the disappearance of the wakeup word;

determining a time point of the appearance of the wakeup word according to the time point of the disappearance of the wakeup word, and a score change record of the wakeup word or an energy fluctuation record of the sampling signal; and determining the time period from the appearance to the disappearance of the wakeup word according to the time point of the appearance of the wakeup word and the time point of the disappearance of the wakeup word.

In this embodiment of this application, it is easy to determine the time point of the disappearance of the wakeup word. For example, a point corresponding to the highest wakeup word detection score may be the time point of the disappearance of the wakeup word, and a time point of the appearance of the wakeup word may be a time point at which the wakeup word detection score starts changing. If no wakeup word appears, the previous wakeup word detection score is basically close to zero. If a wakeup word appears, the wakeup word detection score starts changing, for example, the score rises to 1 or to 2, and the point at which the score starts changing may be determined as the time point of the appearance of the wakeup word.

In addition, determining the time period of the wakeup word according to the wakeup word detection score is only one manner. The manner may alternatively be, for example: determining according to an energy fluctuation record of the sampling signals. Energy is relatively low before and after a user speaks out a wakeup word. Therefore, a time period in which the energy starts to rise and then falls to reach stability may be determined as the time period of the wakeup word.

In this embodiment of this application, a buffer unit may buffer sampling signals, but if a user does not speak out a wakeup word, it is meaningless for the buffer unit to buffer many sampling signals. Therefore, to save buffer space, in this embodiment of this application, buffer is cleared according to lengths of the buffered sampling signals. A solution for clearing the buffer may be: reserving sampling signals within a latest duration (M+N), and deleting sampling signals beyond the duration (M+N) in the buffered multi-channel sampling signals, where M is an occupation duration of the wakeup word, and N is a preset duration.

That is, the buffer unit constantly buffers a latest acquired sampling signals with a length greater than a duration occupied by the wakeup word, so that the wakeup word is buffered while the buffer space can be effectively saved.

After the existence of the wakeup word is determined, an azimuth estimation unit is activated. If it is determined that a moment of the appearance of the wakeup word is $t_0$, and a moment of the disappearance the wakeup word is $t_1$, the azimuth estimation unit extracts a target sampling signal during a time period from $t_0$ to $t_1$ from the buffer unit, and performs a spatial spectrum estimation on the target sampling signal.

The performing, by the terminal device, the spatial spectrum estimation on the target sampling signal to obtain a spatial spectrum estimation result may include: calculating signal power strengths at a plurality of candidate azimuths according to the target sampling signal.

After receiving an activation signal, the azimuth estimation unit calculates a spatial spectrum by using the target sampling signal during the time period from $t_0$ to $t_1$, the spatial spectrum being the signal power strengths corresponding to the plurality of candidate azimuths in all the directions.

The candidate azimuths are selected depending on a usage scenario and an estimation precision requirement. For example, if a circular microphone array is used and the azimuth estimation precision needs to be 10 degrees, the selected alternative directions may be 0°, 10°, 20°, ..., 350°; and if a linear microphone array is used and the azimuth estimation precision needs to be 30 degrees, the selected azimuth directions may be 0°, 30°, 60°, ..., 180°. In this embodiment of this application, the plurality of candidate azimuths may be denoted by $\theta_1, \theta_2, \ldots, \theta_K$, K being a quantity of the candidate azimuths. The signal power strength in each alternative direction is estimated by using a spatial spectrum estimation algorithm, and is denoted by $P_1, P_2, \ldots, P_K$. The spatial spectrum estimation algorithm may be a Super-Cardioid fixed beamforming algorithm or other spatial spectrum estimation algorithms. This is not described in detail herein.

After the spatial spectrum estimation is completed, optionally, the determining, by the terminal device, an azimuth of the target voice according to the spatial spectrum estimation result and a highest wakeup word detection score may include:

determining an azimuth of a target main beam, the target main beam being a main beam of a sampling signal corresponding to the highest wakeup word detection score;

determining a local maximum value point among the signal power strengths at the plurality of candidate azimuths; and determining the azimuth of the target voice according to the azimuth of the target main beam and the local maximum value point.

The determining the azimuth of the target voice according to the azimuth of the target main beam and the local maximum value point may include:

determining a candidate azimuth according to the local maximum value point closest to the azimuth of the target main beam as the azimuth of the target voice; or determining, in a case that there are at least two local maximum value points closest to the azimuth of the target main beam, an average value of candidate azimuths respectively corresponding to the at least two local maximum value points as the azimuth of the target voice.

Figure 5:
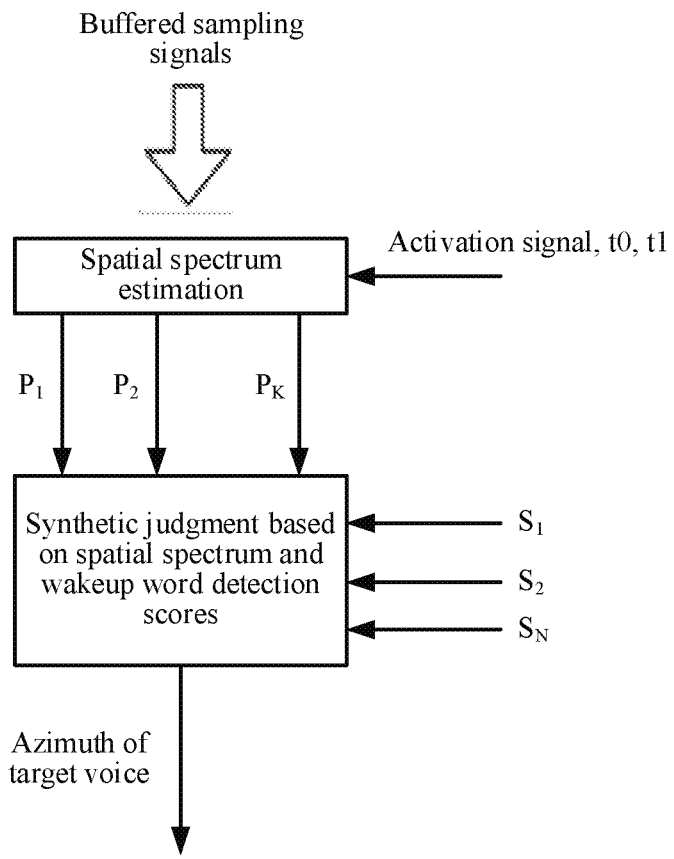
FIG. 5 is a schematic diagram of another embodiment of an azimuth estimation method according to an embodiment of this application.

That is, in an embodiment of this application, as shown in FIG. 5, a process of the azimuth estimation may include two processes: a spatial spectrum estimation, and determination of a spatial spectrum and wakeup word detection scores. In a process of synthetic judgment, interference of strong noise in the spatial spectrum can be removed by using a combination of the spatial spectrum estimation result and the wakeup word detection scores (denoted by $S_1, S_2, \ldots, S_N$). A feasible solution may be determining a highest wakeup word detection score $S_*$ and a main beam direction $\beta_*$ of a front-fixed beamforming algorithm thereof. A higher wakeup word score represents better target voice quality and less residual noise, and then the direction of the target voice is near $\beta_*$. A local maximum value point closest to $\beta_*$ is found from all the local maximum value points in the spatial spectrum, and an candidate azimuth corresponding thereto is $\theta_*$, $\theta_*$ being an estimation of the azimuth of the target voice.

When there is strong noise in an environment, there may be a plurality of local maximum value points in the spatial spectrum in the foregoing algorithm design. One or more local maximum value points may be caused by noise interference, and the candidate azimuth corresponding thereto represents the direction of point-source interference noise in the environment. With the assistance of $\beta_*$ in the azimuth, the interference generated by such noise may be removed. For example, there are one local maximum value point in the direction of 90 degrees and one local maximum value point in the direction of 270 degrees, and a local maximum value point in the direction of 90 degrees may be selected according to a highest wakeup word detection score $S_*$ and a main beam direction $\beta_*=60°$ of a front-fixed beamforming algorithm thereof, to accurately determine that the azimuth of the target voice is 90 degrees.

In addition, because a wakeup word in human-computer interaction has a natural minimum length limitation, denoted by T min. There is no second wakeup within T min after one wakeup. Therefore, the amount of computing for wakeup word detection during this period may be saved for the azimuth estimation.

Therefore, optionally, in this embodiment of this application, when the terminal device performs the spatial spectrum estimation on the buffered multi-channel sampling signals to obtain a spatial spectrum estimation result, the method may further include:

stopping the wakeup word detection on the one or more sampling signals in the multi-channel sampling signals within a duration from determination of the existence of the wakeup word to reappearance of the wakeup word.

Therefore, in this embodiment of this application, before the wakeup word is detected, a multi-channel wakeup word detection module continues to operate, an azimuth estimation module does not make any computing, and a voice signal processing module does not make any processing but only tracks an internal state.

If the wakeup word is detected at a moment Ts, the calculation of all the multi-channel wakeup word detection modules is stopped during a time period from Ts to Ts+T min, and the calculation may include the front-fixed beamforming algorithm, a noise reduction algorithm and a single-channel wakeup word detection module.

The spatial spectrum estimation is performed by using the spatial spectrum estimation algorithm during the time period from Ts to Ts+T min to obtain better spatial spectrum estimation performance and resolution, and to finally obtain an optimal azimuth of the target voice in combination with a wakeup word detection score at the moment Ts.

According to the foregoing solution of performing wakeup word detection and the azimuth estimation at different times, a system peak computing amount may be reduced, a system delay may be reduced, and a possible frame loss, possible signal discontinuity and the like may be avoided.

In this embodiment of this application, no calculation for the azimuth estimation is performed before the wakeup word is detected. After an activation signal provided by a wakeup word module is received, the target sampling signal during the time period from $t_0$ to $t_1$ is extracted from the buffer unit, and a possible azimuth of the voice signal is estimated. A final estimation result of the azimuth of the target voice is obtained according to a combination of the estimation result and the scores obtained by the multi-channel wakeup word detection module, and the azimuth of the target voice is outputted to the voice signal processing module, so that the voice signal processing module may enhance a signal in the direction of the azimuth of the target voice in the process of the voice interaction, and suppress signals in other directions, thereby ensuring smooth voice interaction.

Before the wakeup word is detected, the voice signal processing module only performs internal state tracking, such as echo cancellation, noise strength, or voice detection, but does not perform any processing on the multi-channel sampling signals. After an activation signal provided by a wakeup word score synthetic judgment module is received, the target voice signal is enhanced by using a latest azimuth of the voice signal estimated by the azimuth estimation module as a target direction of a voice processing algorithm such as the beamforming algorithm, and the enhanced signal is outputted to a speech recognition module.

Before the wakeup word is detected, the speech recognition module does not perform any recognition computing. After the activation signal provided by the wakeup word score synthetic judgment module is received, the enhanced target voice signal provided by the voice signal processing module is recognized, and the recognition result is provided until the recognition is completed.

The azimuth estimation method in a voice interaction process is described according to the foregoing embodiments. The following describes a terminal device in an embodiment of this application with reference to the accompanying drawings.

Figure 6:
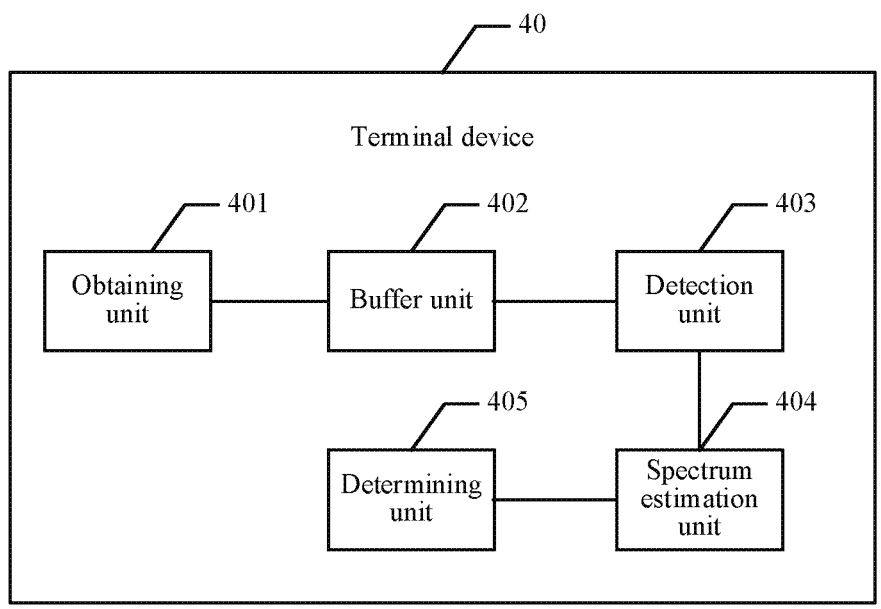
FIG. 6 is a schematic diagram of an embodiment of a terminal device according to an embodiment of this application.

As shown in FIG. 6, the terminal device 40 provided in this embodiment of this application includes one or more processors and one or more memories storing program units, the program unit being executed by the processor, the program unit including:

an obtaining unit 401, configured to obtain multi-channel sampling signals;

a buffer unit 402, configured to buffer the multi-channel sampling signals obtained by the obtaining unit 401;

a detection unit 403, configured to perform wakeup word detection on one or more sampling signals of the multi-channel sampling signals buffered by the buffer unit 402, and determine a wakeup word detection score for each channel of the one or more sampling signals;

a spectrum estimation unit 404, configured to perform a spatial spectrum estimation on the buffered multi-channel sampling signals to obtain a spatial spectrum estimation result, when the wakeup word detection scores of the one or more sampling signals indicates that a wakeup word exists in the one or more sampling signals determined by the detection unit 403, that the wakeup word exists; and a determining unit 405, configured to determine an azimuth of a target voice associated with the multi-channel sampling signals according to the spatial spectrum estimation result and a highest wakeup word detection score detected by the detection unit 403.

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

Optionally, the determining unit 405 is further configured to determine a time period from appearance to disappearance of the wakeup word; and The spectrum estimation unit 404 is configured to:

extract a target sampling signal during the time period from the buffered multi-channel sampling signals; and perform the spatial spectrum estimation on the target sampling signal to obtain the spatial spectrum estimation result.

Optionally, the spectrum estimation unit 404 is further configured to calculate signal power strengths at a plurality of candidate azimuths according to the target sampling signal.

Optionally, the spectrum estimation unit 404 is configured to:

determine an azimuth of a target main beam, the target main beam being a main beam of a sampling signal corresponding to the highest wakeup word detection score;

determine a local maximum value point in the signal power strengths at the plurality of candidate azimuths; and determine the azimuth of the target voice according to the azimuth of the target main beam and the local maximum value point.

Optionally, the spectrum estimation unit 404 is configured to:

determine an candidate azimuth corresponding to a local maximum value point closest to the azimuth of the target main beam as the azimuth of the target voice.

Optionally, the spectrum estimation unit 404 is configured to:

determine, in a case that there are at least two local maximum value points closest to the azimuth of the target main beam, an average value of candidate azimuths respectively corresponding to the at least two local maximum value points as the azimuth of the target voice.

Optionally, the determining unit 405 is configured to:

determine a time point of the disappearance of the wakeup word;

determine a time point of the appearance of the wakeup word according to the time point of the disappearance of the wakeup word, and a score change record of the wakeup word or an energy fluctuation record of the sampling signal; and determine the time period from the appearance to the disappearance of the wakeup word according to the time point of the appearance of the wakeup word and the time point of the disappearance of the wakeup word.

Figure 7:
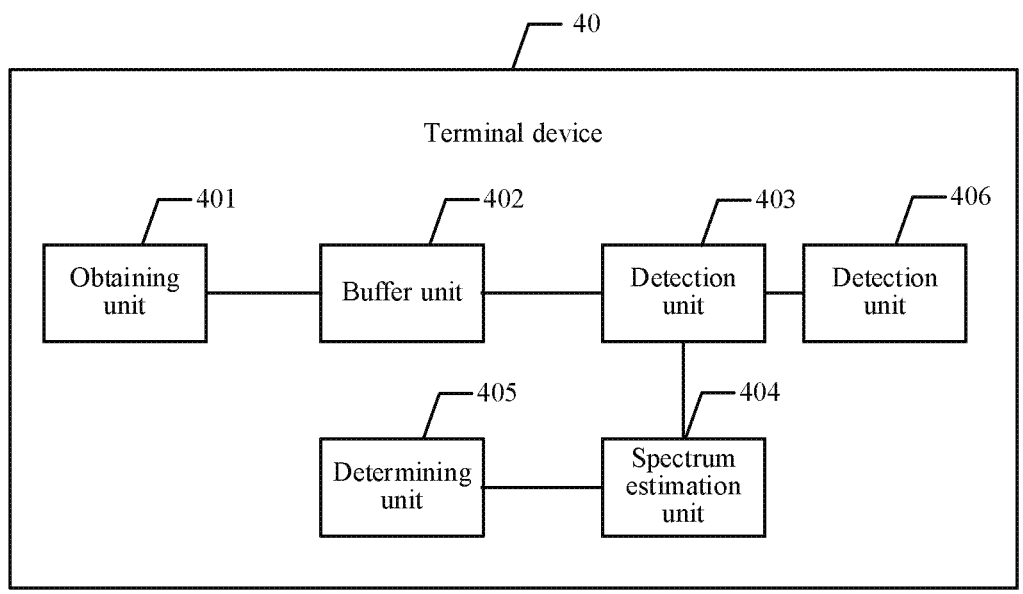
FIG. 7 is a schematic diagram of an embodiment of a terminal device according to an embodiment of this application.

Optionally, as shown in FIG. 7, the terminal device 40 provided in this embodiment of this application further includes a control unit 406.

The control unit 406 is configured to stop the wakeup word detection on the sampling signal of each channel in the multi-channel sampling signals within a duration from determination of the existence of the wakeup word to reappearance of the wakeup word.

Optionally, the detection unit 403 is configured to:

perform the wakeup word detection on the sampling signal of each channel in the multi-channel sampling signals, and determine a confidence of a wakeup word of the sampling signal of each channel, the confidence being a similarity between content in the sampling signal of each channel and a preconfigured wakeup word; and determine the wakeup word detection score of the sampling signal of each channel according to the confidence of the wakeup word of the sampling signal of each channel.

Optionally, the determining unit 405 is further configured to determine, according to the wakeup word detection score of the sampling signal of each channel, that the wakeup word exists, in a case that the wakeup word detection score of the sampling signal of any channel in the sampling signal of each channel is greater than a score threshold.

Figure 8:
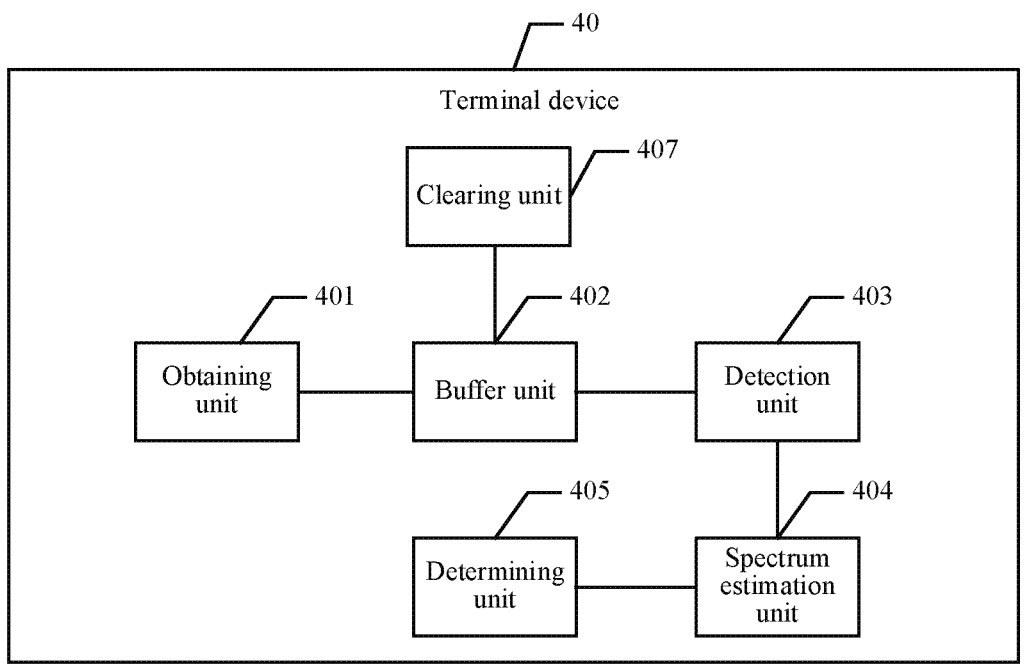
FIG. 8 is a schematic diagram of an embodiment of a terminal device according to an embodiment of this application.

Optionally, as shown in FIG. 8, the terminal device 40 provided in this embodiment of this application further includes a clearing unit 407.

The clearing unit 407 is configured to reserve sampling signals within a latest duration (M+N), and delete sampling signals beyond the duration (M+N) in the buffered multi-channel sampling signals, M being an occupation duration of the wakeup word, and N being a preset duration.

To understand the terminal device 40 described in the foregoing embodiment, refer to some of corresponding descriptions of FIG. 1 to FIG. 5. Details are not described herein again.

Figure 9:
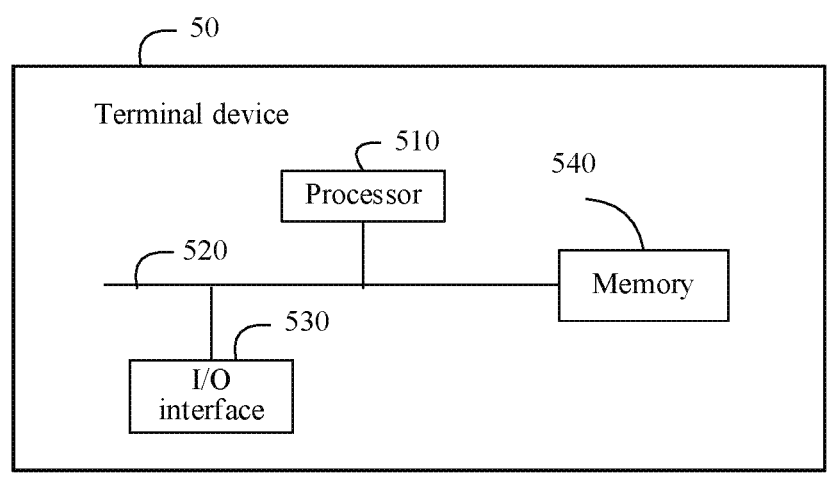
FIG. 9 is a schematic diagram of an embodiment of a terminal device according to an embodiment of this application.

FIG. 9 is a schematic structural diagram of a terminal device 50 according to an embodiment of this application. The terminal device 50 includes a processor 510, a memory 540, and an input/output (I/O) interface 530. The memory 540 may include a read-only memory and a random access memory, and provides an operation instruction and data to the processor 510. A part of the memory 540 may further include a non-volatile random access memory (NVRAM).

In some implementations, the memory 540 stores the following element, an executable module or a data structure, or a subset thereof, or an extension set thereof.

In this embodiment of this application, in the azimuth estimation process, by invoking the operation instruction (the operation instruction may be stored in an operating system) stored in the memory 540, the following operations may be performed:

obtaining multi-channel sampling signals and buffering the multi-channel sampling signals;

performing wakeup word detection on a sampling signal of each channel in the multi-channel sampling signals, and determining a wakeup word detection score of the sampling signal of each channel;

performing a spatial spectrum estimation on the buffered multi-channel sampling signals to obtain a spatial spectrum estimation result, upon determining, according to the wakeup word detection score of the sampling signal of each channel, that a wakeup word exists, the wakeup word being included in a target voice; and determining an azimuth of the target voice according to the spatial spectrum estimation result and a highest wakeup word detection score.

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

The processor 510 controls an operation of the terminal device 50, and the processor 510 may alternatively be referred to as a central processing unit (CPU). The memory 540 may include a read-only memory and a random access memory, and provides an instruction and data to the processor 510. A part of the memory 540 may further include a non-volatile random access memory (NVRAM). During specific application, components of the terminal device 50 are coupled together by using a bus system 520. In addition to a data bus, the bus system 520 may further include a power bus, a control bus, a status signal bus, and the like. However, for ease of clear description, all types of buses in the diagram are marked as the bus system 520.

The method disclosed in the foregoing embodiments of this application may be applied to the processor 510, or may be implemented by the processor 510. The processor 510 may be an integrated circuit chip and has a signal processing capability. During implementation, the steps of the foregoing method may be implemented by using a hardware integrated logic circuit in the processor 510 or implemented by using an instruction in a software form. The foregoing processor 510 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 510 may implement or perform the methods, the steps, and logic block diagrams that are disclosed in the embodiments of this application. The general-purpose processor may be a microprocessor, or the processor may be any conventional processor or the like. Steps of the method disclosed with reference to the embodiments of this application may be directly performed or completed by using a hardware decoding processor, or may be performed or completed by using a combination of hardware and a software module in the decoding processor. The software module may be in a mature storage medium in the art, such as a random access memory, a flash memory, a read-only memory, a programmable read-only memory, an electrically erasable programmable memory, or a register. The storage medium is in the memory 540, and the processor 510 reads information in the memory 540 to complete the steps of the foregoing method in combination with hardware thereof.

Optionally, the processor 510 is configured to:

determine a time period from appearance to disappearance of the wakeup word;

extract a target sampling signal during the time period from the buffered multi-channel sampling signals; and perform the spatial spectrum estimation on the target sampling signal to obtain the spatial spectrum estimation result.

Optionally, the processor 510 is configured to:

calculate signal power strengths at a plurality of candidate azimuths according to the target sampling signal.

Optionally, the processor 510 is configured to:

determine an azimuth of a target main beam, the target main beam being a main beam of a sampling signal corresponding to the highest wakeup word detection score;

determine a local maximum value point in the signal power strengths at the plurality of candidate azimuths; and determine the azimuth of the target voice according to the azimuth of the target main beam and the local maximum value point.

Optionally, the processor 510 is configured to:

determine an candidate azimuth corresponding to a local maximum value point closest to the azimuth of the target main beam as the azimuth of the target voice.

Optionally, the processor 510 is configured to:

determine, in a case that there are at least two local maximum value points closest to the azimuth of the target main beam, an average value of candidate azimuths respectively corresponding to the at least two local maximum value points as the azimuth of the target voice.

Optionally, the processor 510 is configured to:

determine a time point of the disappearance of the wakeup word;

determine a time point of the appearance of the wakeup word according to the time point of the disappearance of the wakeup word, and a score change record of the wakeup word or an energy fluctuation record of the sampling signal; and determine the time period from the appearance to the disappearance of the wakeup word according to the time point of the appearance of the wakeup word and the time point of the disappearance of the wakeup word.

Optionally, the processor 510 is further configured to:

stop the wakeup word detection on the sampling signal of each channel in the multi-channel sampling signals within a duration from determination of the existence of the wakeup word to reappearance of the wakeup word.

Optionally, the processor 510 is configured to:

perform the wakeup word detection on the sampling signal of each channel in the multi-channel sampling signals, and determine a confidence of a wakeup word of the sampling signal of each channel, the confidence being a similarity between content in the sampling signal of each channel and a preconfigured wakeup word; and determine the wakeup word detection score of the sampling signal of each channel according to the confidence of the wakeup word of the sampling signal of each channel.

Optionally, the processor 510 is further configured to:

determine, according to the wakeup word detection score of the sampling signal of each channel, that the wakeup word exists, in a case that the wakeup word detection score of the sampling signal of any channel in the sampling signal of each channel is greater than a score threshold.

Optionally, the processor 510 is further configured to:

reserve sampling signals within a latest duration (M+N), and delete sampling signals beyond the duration (M+N) in the buffered multi-channel sampling signals, M being an occupation duration of the wakeup word, and N being a preset duration.

To understand the terminal device 50 described in the foregoing embodiment, refer to some of corresponding descriptions of FIG. 1 to FIG. 5. Details are not described herein again.

All or some of the foregoing embodiments may be implemented by software, hardware, firmware, or any combination thereof. When software is used for implementation, all or some of the embodiments may be implemented in a form of a computer program product.

The computer program product includes one or more computer program instructions. When the computer program instruction is loaded and executed on a computer, all or some of the procedures or functions according to the embodiments of this application are generated. The computer may be a general-purpose computer, a special-purpose computer, a computer network, or another programmable apparatus. The computer instructions may be stored in a non-transitory computer-readable storage medium or may be transmitted from a computer-readable storage medium to another computer-readable storage medium. For example, the computer instruction may be transmitted from a website, computer, server, or data center to another website, computer, server, or data center in a wired manner (for example, a coaxial cable, an optical fiber, or a digital subscriber line (DSL)) or a wireless manner (for example, infrared, radio, or microwave). The computer-readable storage medium may be any usable medium that can be stored in a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the steps of the methods in the embodiments may be implemented by a program instructing relevant hardware. The program may be stored in a non-transitory computer-readable storage medium. The storage medium may include: a ROM, a RAM, a magnetic disk, an optical disc or the like.

The azimuth estimation method, the terminal device, and the computer-readable storage medium provided in the embodiments of this application are described above in detail. Although the principles and implementations of the embodiments of this application are described by using specific examples in the specification, the foregoing descriptions of the embodiments are only intended to help understand the method and core idea of this application. Meanwhile, a person of ordinary skill in the art may make modifications to the specific implementations and application range according to the idea of the embodiments of this application. In conclusion, the content of the specification is not to be construed as a limitation to this application.

INDUSTRIAL APPLICABILITY

In the embodiments of this application, an azimuth of a target voice is detected according to a spatial spectrum estimation result of multi-channel sampling signals with the assistance of a highest wakeup word score in the multi-channel sampling signals, so that the impact of noise on target voice azimuth detection is avoid, and the accuracy of an azimuth estimation in a voice interaction process is improved.

What is claimed is:

1. An azimuth estimation method performed at a computing device having one or more processors and memory storing a plurality of computer programs to be executed by the processor, the method comprising:

obtaining, in real time, multi-channel sampling signals and buffering the multi-channel sampling signals, wherein the multi-channel sampling signals are respectively obtained through N1 channels corresponding to N1 beams in N1 different directions;

performing wakeup word detection on one or more sampling signals of the multi-channel sampling signals, and determining a wakeup word detection score for each channel of the one or more sampling signals;

computing, upon a determination that the wakeup word detection scores of the one or more sampling signals indicates that a wakeup word exists in the one or more sampling signals, a time period from appearance to disappearance of the wakeup word based on the wakeup word detection scores, further including:

determining a time point of the appearance of the wakeup word as a starting time point at which a wakeup word detection score starts changing;

determining a time point of the disappearance of the wakeup word as an ending time point corresponding to the highest wakeup word detection score among the wakeup word detection scores; and determining the time period from the appearance to the disappearance of the wakeup word according to the starting time point and the ending time point;

extracting a target sampling signal within the time period from the buffered multi-channel sampling signals;

performing a spatial spectrum estimation on the target sampling signal extracted within the time period to obtain a spatial spectrum estimation result indicating signal power strengths at N2 candidate azimuths, wherein N2 is different from N1; and determining, among the N2 candidate azimuths, an azimuth of a target voice associated with the multi-channel sampling signals based on the spatial spectrum estimation result and a highest wakeup word detection score.

2. The method according to claim 1, wherein the performing the spatial spectrum estimation on the target sampling signal to obtain the spatial spectrum estimation result comprises:

calculating the signal power strengths at the N2 candidate azimuths based on the target sampling signal, wherein N2 is larger than N1.

3. The method according to claim 2, wherein the determining an azimuth of a target voice associated with the multi-channel sampling signals based on the spatial spectrum estimation result and a highest wakeup word detection score comprises:

determining an azimuth of a target main beam, the target main beam being a main beam, among the N1 beams, of a sampling signal corresponding to the highest wakeup word detection score;

determining at least one local maximum value point among the signal power strengths at the N2 candidate azimuths; and determining the azimuth of the target voice based on the azimuth of the target main beam and the at least one local maximum value point.

4. The method according to claim 3, wherein the determining the azimuth of the target voice based on the azimuth of the target main beam and the local maximum value point comprises:

determining, among the N2 candidate azimuths, a candidate azimuth corresponding to a local maximum value point that is closest to the azimuth of the target main beam among the at least one local maximum value point; and determining the candidate azimuth as the azimuth of the target voice.

5. The method according to claim 3, wherein the determining the azimuth of the target voice based on the azimuth of the target main beam and the at least one local maximum value point comprises:

when there are at least two local maximum value points closest to the azimuth of the target main beam, determining an average value of candidate azimuths respectively corresponding to the at least two local maximum value points as the azimuth of the target voice.

6. The method according to claim 1, wherein during the performing the spatial spectrum estimation, the method further comprises: stopping the wakeup word detection on the one or more sampling signals in the multi-channel sampling signals within a duration from determination of the existence of the wakeup word to reappearance of the wakeup word.

7. The method according to claim 1, wherein the performing wakeup word detection on one or more sampling signals of the multi-channel sampling signals, and determining a wakeup word detection score for each channel of the one or more sampling signals comprises:

performing the wakeup word detection on the one or more sampling signals in the multi-channel sampling signals, and determining a confidence of a wakeup word of each channel of the one or more sampling signals, the confidence being a similarity between content in the sampling signal and a preconfigured wakeup word; and determining the wakeup word detection score for each channel of the one or more sampling signals according to the confidence of the wakeup word of the sampling signal.

8. The method according to claim 1, further comprising: determining that the wakeup word exists when the wakeup word detection score of any channel of the one or more sampling signals is greater than a score threshold.

9. The method according to claim 1, further comprising: reserving sampling signals within a latest duration (M+N), and deleting sampling signals beyond the duration (M+N) in the buffered multi-channel sampling signals, M being an occupation duration of the wakeup word, and N being a preset duration.

10. A computing device, comprising one or more processors, memory and a plurality of computer programs stored in the memory that, when executed by the one or more processors, cause the computing device to perform a plurality of operations including:

obtaining, in real time, multi-channel sampling signals and buffering the multi-channel sampling signals, wherein the multi-channel sampling signals are respectively obtained through N1 channels corresponding to N1 beams in N1 different directions;

performing wakeup word detection on one or more sampling signals of the multi-channel sampling signals, and determining a wakeup word detection score for each channel of the one or more sampling signals;

computing, upon a determination that the wakeup word detection scores of the one or more sampling signals indicates that a wakeup word exists in the one or more sampling signals, a time period from appearance to disappearance of the wakeup word based on the wakeup word detection scores, further including:

determining a time point of the appearance of the wakeup word as a starting time point at which a wakeup word detection score starts changing;

determining a time point of the disappearance of the wakeup word as an ending time point corresponding to the highest wakeup word detection score among the wakeup word detection scores; and determining the time period from the appearance to the disappearance of the wakeup word according to the starting time point and the ending time point;

extracting a target sampling signal within the time period from the buffered multi-channel sampling signals;

performing a spatial spectrum estimation on the target sampling signal extracted within the time period to obtain a spatial spectrum estimation result indicating signal power strengths at N2 candidate azimuths, wherein N2 is different from N1; and determining, among the N2 candidate azimuths, an azimuth of a target voice associated with the multi-channel sampling signals based on the spatial spectrum estimation result and a highest wakeup word detection score.

11. The computing device according to claim 10, wherein the performing the spatial spectrum estimation on the target sampling signal to obtain the spatial spectrum estimation result comprises:

calculating the signal power strengths at the N2 candidate azimuths based on the target sampling signal, wherein N2 is larger than N1.

12. The computing device according to claim 11, wherein the determining an azimuth of a target voice associated with the multi-channel sampling signals based on the spatial spectrum estimation result and a highest wakeup word detection score comprises:

determining an azimuth of a target main beam, the target main beam being a main beam, among the N1 beams, of a sampling signal corresponding to the highest wakeup word detection score;

determining at least one local maximum value point among the signal power strengths at the N2 candidate azimuths; and determining the azimuth of the target voice based on the azimuth of the target main beam and the at least one local maximum value point.

13. The computing device according to claim 10, wherein during the performing the spatial spectrum estimation, the plurality of operations further comprise:

stopping the wakeup word detection on the one or more sampling signals in the multi-channel sampling signals within a duration from determination of the existence of the wakeup word to reappearance of the wakeup word.

14. The computing device according to claim 10, wherein the performing wakeup word detection on one or more sampling signals of the multi-channel sampling signals, and determining a wakeup word detection score for each channel of the one or more sampling signals comprises:

performing the wakeup word detection on the one or more sampling signals in the multi-channel sampling signals, and determining a confidence of a wakeup word of each channel of the one or more sampling signals, the confidence being a similarity between content in the sampling signal and a preconfigured wakeup word; and determining the wakeup word detection score for each channel of the one or more sampling signals according to the confidence of the wakeup word of the sampling signal.

15. The computing device according to claim 10, wherein the plurality of operations further comprise:

determining that the wakeup word exists when the wakeup word detection score of any channel of the one or more sampling signals is greater than a score threshold.

16. A non-transitory computer-readable storage medium storing a plurality of computer programs that, when executed by one or more processors of a computing device, cause the computing device to perform a plurality of operations including:

obtaining, in real time, multi-channel sampling signals and buffering the multi-channel sampling signals, wherein the multi-channel sampling signals are respectively obtained through N1 channels corresponding to N1 beams in N1 different directions;

performing wakeup word detection on one or more sampling signals of the multi-channel sampling signals, and determining a wakeup word detection score for each channel of the one or more sampling signals;

computing, upon a determination that the wakeup word detection scores of the one or more sampling signals indicates that a wakeup word exists in the one or more sampling signals, a time period from appearance to disappearance of the wakeup word based on the wakeup word detection scores, further including:

determining a time point of the appearance of the wakeup word as a starting time point at which a wakeup word detection score starts changing;

determining a time point of the disappearance of the wakeup word as an ending time point corresponding to the highest wakeup word detection score among the wakeup word detection scores; and determining the time period from the appearance to the disappearance of the wakeup word according to the starting time point and the ending time point;

extracting a target sampling signal within the time period from the buffered multi-channel sampling signals;

performing a spatial spectrum estimation on the target sampling signal extracted within the time period to obtain a spatial spectrum estimation result indicating signal power strengths at N2 candidate azimuths, wherein N2 is different from N1; and determining, among the N2 candidate azimuths, an azimuth of a target voice associated with the multi-channel sampling signals based on the spatial spectrum estimation result and a highest wakeup word detection score.

17. The non-transitory computer-readable storage medium according to claim 16, wherein the plurality of operations further comprise:

during the performing the spatial spectrum estimation, stopping the wakeup word detection on the one or more sampling signals in the multi-channel sampling signals within a duration from determination of the existence of the wakeup word to reappearance of the wakeup word.

18. The non-transitory computer-readable storage medium according to claim 16, wherein the performing wakeup word detection on one or more sampling signals of the multi-channel sampling signals, and determining a wakeup word detection score for each channel of the one or more sampling signals comprises:

performing the wakeup word detection on the one or more sampling signals in the multi-channel sampling signals, and determining a confidence of a wakeup word of each channel of the one or more sampling signals, the confidence being a similarity between content in the sampling signal and a preconfigured wakeup word; and determining the wakeup word detection score for each channel of the one or more sampling signals according to the confidence of the wakeup word of the sampling signal.

19. The non-transitory computer-readable storage medium according to claim 16, wherein the plurality of operations further comprise:

determining that the wakeup word exists when the wakeup word detection score of any channel of the one or more sampling signals is greater than a score threshold.

20. The non-transitory computer-readable storage medium according to claim 16, wherein the plurality of operations further comprise:

reserving sampling signals within a latest duration (M+N), and deleting sampling signals beyond the duration (M+N) in the buffered multi-channel sampling signals, M being an occupation duration of the wakeup word, and N being a preset duration.

* * * * *